United States Patent Office 3,154,379
Patented Oct. 27, 1964

3,154,379
PLUTONIUM SEPARATION FROM URANIUM AND LANTHANIDES BY PRECIPITATION FROM MOLTEN CHLORIDE SOLUTIONS
Glen E. Benedict and John L. Swanson, Richland, Wash., assignors to the United States of America as represented by the United States Atomic Energy Commission
No Drawing. Filed May 10, 1963, Ser. No. 279,640
4 Claims. (Cl. 23—14.5)

This invention deals with the separation of plutonium from uranium and lanthanide rare earths other than cerium and in particular with the recovery of these values from a solution in fused chloride mixtures.

Neutron-irradiated fuel is usually processed for the separate recovery of fissile and fertile components free from fission products, some of which are lanthanide rare earths; these lanthanides act as so-called poisons in reactors on account of their relatively great neutron-capture cross section and for this reason fuel should be "decontaminated" from them prior to reuse.

Many of the processes that have been suggested for the separation of the components of neutron-irradiated fuel are carried out from solutions in fused salts, and some of these again are electrodeposition processes. Such a process is described, for instance, in assignee's U.S. Patent No. 3,011,865, granted to Glen E. Benedict et al. on December 5, 1961. In this patented process plutonium is recovered in the form of a $PuO_2$—$UO_2$ mixture.

It is an object of this invention to provide a process for the recovery of plutonium dioxide from fused chloride solutions which is simple and relatively inexpensive.

It is another object of this invention to provide a process for the recovery of plutonum dioxide from fused chloride solutions which is suitable for remote control operation.

It is finally also an object of this invention to provide a process for the recovery of plutonium dioxide from fused chloride solutions which leads to a product of a high degree of purity.

These objects are accomplished by dissolving the fuel to be processed in a fused mixture of alkali metal chlorides; sparging the fused solution obtained with chlorine gas while introducing an oxidizing agent, namely oxygen or tin dioxide, whereby plutonium predominantly precipitates as plutonium dioxide while the uranium and the rare earths predominantly remain dissolved in the chloride mixture; and separating the precipitate from the salt.

Any fuel that is chlorinatable is suitable for the process of this invention. Thus, metals and oxides can be employed and, of course, chlorides are also suitable.

If the fuel to be processed is in the form of clad fuel elements, decladding has to be carried out prior to the processing proper of the core. Decladding can be done by mechanical means or by known chemical processes. The core is then advantageously broken up into pieces by known mechanical means, e.g. with on air-driven hammer.

Thereafter the fuel core is introduced into the fused chloride mixture for dissolution. Dissolution of the fuel material in the molten salt is aided by sparging chlorine gas through the fused salt, as is known to those skilled in the art. Lithium chloride-potassium chloride and lithium chloride-sodium chloride were found to be the best suitable chloride mixtures for the process of this invention. While equimolar compositions are operative, mixtures are preferred that contain from 2 to 3, and preferably about 2.5 moles of lithium chloride per one mole of potassium or sodium chloride. This is shown in Table I where three experiments carried out under conditions that were identical with the exception of the salt composition and their results are summarized. In these experiments promethium was used as a representative lanthanide rare earth. The decontamination factors for plutonium from uranium and promethium, respectively, are Promethium (or uranium) in initial salt solution × plutonium in precipitate
———————————————————————————
Plutonium in initial salt solution × promethium (or uranium) in precipitate For the experiments of Table I stannic oxide was added to the salt melt as the oxidizing mixture in a quantity 31 times that stoichiometrically required for the oxidation of all of the plutonium present, and chlorine was passed through the mixture simultaneously. The $SnO_2$ was added stepwise in finely divided form. A precipitate formed thereby that was a mixture of $PuO_2$ and the excess of $SnO_2$. After solid-liquid separation, both, precipitate and salt, were analyzed for promethium, plutonium and uranium. The results are given in Table I.

TABLE I

| Salt System | Percent Pu pptd. | Decontamination Factor | |
|---|---|---|---|
| | | Pm | U |
| LiCl—KCl | 10 | 3.3 | 37 |
| 2.6 LiCl—KCl | 28 | 22 | 142 |
| 2.6 LiCl—NaCl | 90 | 90 | 500 |

These experiments show that only very little plutonium could be precipitated when the equimolar salt mixture was used and that then decontamination factors were comparatively low. Much better results were obtained with the 2.6 lithium chloride-1 alkali metal chloride mixture; with such a lithium chloride-sodium chloride mixture 90% of the plutonium was precipitated. The decontamination factors of the plutonium from both promethium and uranium also were very high with this salt mixture.

When the precipitation of plutonium oxide was accomplished with an oxygen-chlorine mixture, the situation was somewhat different, the potassium-chloride-containing lithium chloride giving better results as to plutonium precipitation than the sodium-chloride-containing lithium chloride. However, the sodium-chloride-containing mixtures yielded better decontamination from uranium than the potassium-chloride-containing mixture. This is shown in Table II.

TABLE II

| Salt System | Vol. Percent $O_2$ in Sparge | Percent Pu pptd. | Decontamination Factor | |
|---|---|---|---|---|
| | | | Pm | U |
| 2.6 LiCl—NaCl | 75 | 60 | 11 | 360 |
| 2.6 LiCl—NaCl | 55 | 85 | 50 | 575 |
| 2.6 LiCl—NaCl | 28 | 86 | 370 | 1,500 |
| 2.6 LiCl—KCl | 55 | 90 | 600 | 1,100 |

Oxygen contents of 28 and 55% by volume in the chlorine gas were satisfactory as to both plutonium precipitation and decontamination. An oxygen content of 75%, on the other hand, resulted in a plutonium precipitation of 60% only and a decontamination factor from promethium of 11. Table II thus suggests the use of a salt mixture containing about 2.6 moles of lithium chloride per one mole of potassium chloride and a sparging gas of about 45 vol. percent of chlorine and 55 vol. percent of oxygen. Other experiments indicated that the chlorine content in the gas mixture can range between 25 and 70% by volume.

All experiments were carried out in a dry box and with anhydrous gases. The sparging gases were dried prior to use by passing them over magnesium perchlorate.

While both tin dioxide and oxygen together with chlorine gas gave satisfactory results, the use of the oxygen-containing gas mixture is preferred, because it yields a pure plutonium dioxide product, while in the tin dioxide modification the precipitate is a mixture of plutonium oxide with the excess of tin dioxide.

The minimum temeprature of the fused bath is dependent on the composition of the salt mixture. For the preferred bath, namely 2.5 moles of lithium chloride and one mole of potassium or sodium chloride, a temperature of between 550 and 600° C. proved sufficient. A reaction time of approximately four hours was usually satisfactory.

After the reaction, the precipitate is separated from the molten salt by known means and then rinsed with dilute hydrochloric acid to remove any adhering salt. In the case of the tin dioxide as oxidizing agent, the plutonium dioxide-tin dioxide mixture is preferably processed for isolation of the plutonium dioxide by treating the precipitate with hydrogen chloride vapor at elevated temperature whereby the tin dioxide is converted to the tetrachloride and volatilized as such. The plutonium dioxide precipitated with the oxygen-chlorine mixture is a dense crystalline product.

The process of this invention lends itself very well to the coprecipitation of plutonium oxide and thorium oxide by dissolving a material that contains both plutonium and thorium values in chlorinatable form. Such plutonium oxide-thorium oxide mixtures are desirable for the production of $U^{233}$.

The flowsheet for processing neutron-irradiated uranium containing plutonium and fission products and using the process of this invention may comprise dissolution of the core material in the molten chloride mixture as described above by immersing the fuel therein and sparging chlorine gas therethrough, followed by the process of U.S. Patent No. 3,011,865, referred to above for the electrodeposition of uranium dioxide; thereafter the process of this invention is applied for the precipitation of the plutonium and its separation from the fission products.

In the following, two examples of the process claimed are given for illustrative purposes.

*Example I*

Eighteen grams of uranium, 0.6 gram of plutonium and 0.03 gram of europium as a representative lanthanide were dissolved as the oxides $U_3O_8$, $PuO_2$ and $Eu_2O_3$ in 150 grams of a molten lithium chloride-potassium chloride bath in which the mole ratio was 2.5; dissolution was accomplished by passing a chlorine-hydrogen chloride gas mixture through the bath. Electrolysis was then carried out at 575° C. while chlorine was sparged through the bath. By this, uranium dioxide was deposited on the cathode. The cathode deposit contained 96% of the uranium, 0.9% of the plutonium and 0.6% of the europium.

Thereafter the electrode containing the uranium dioxide deposit was withdrawn, and the electrolyte was sparged at 550° C. with a gas mixture containing 35% of oxygen and 65% by volume of chlorine at a flow rate of 150 ml./min. for 3½ hours. A precipitate of plutonium dioxide was obtained thereby that was contaminated by 0.06% of the uranium and 0.65% of the europium originally present. The plutonium precipitated represented a yield of 92%.

*Example II*

Plutonium and thorium chlorides were dissolved in a molten lithium chloride-potassium chloride mixture, mole ratio 2.6:1, in quantities to obtain a solution containing 1 wt. percent of plutonium and 5 wt. percent of thorium. The temperature was maintained at about 575° C. An oxygen-chlorine mixture, volume ratio 1:1, was passed through the salt solution, whereby a green precipitate formed. Analysis of the precipitate showed that it contained plutonium: thorium in a weight ratio of 0.4.

A similar experiment was carried out from a melt containing 2 wt. percent of plutonium and 2 wt. percent of thorium. The black precipitate obtained in this instance, when analyzed by X-ray diffraction analysis, proved to be a mixture of two $PuO_2$—$ThO_2$ compounds, one compound having a plutonium:thorium ratio of four and the other one a ratio of one.

It will be understood that the invention is not to be limited to the details given herein but that it may be modified within the scope of the appended claims.

The embodiments of the invention in which an exclusive property or privilege is claimed are defined as follows:

1. A process of recovering plutonium dioxide from a chlorinatable mixture containing uranium, plutonium and lanthanide rare earth values, comprising dissolving said mixture in a fused salt containing 2 to 3 moles of lithium chloride per one mole of alkali metal chloride selected from the group consisting of potassium chloride and sodium chloride; sparging the fused solution obtained with chlorine gas while introducing an oxidizing agent selected from the group consisting of oxygen and stannic oxide, whereby plutonium predominantly precipitates as plutonium dioxide, while the uranium and the rare earths predominantly remain dissolved in said chloride mixture; and separating the precipitate from the salt.

2. The process of claim 1 wherein stannic oxide is used as the oxidizing agent in a quantity excessive of that stoichiometrically required and the salt is a lithium chloride-sodium chloride mixture in the mole ratio of about 2.6:1.

3. The process of claim 1 wherein the oxidizing agent is oxygen and is introduced simultaneously with the chlorine gas as an oxygen-chlorine mixture containing from 25 to 70% by volume of chlorine and wherein said salt is lithium chloride-potassium chloride having a mole ratio of about 2.6.

4. The process of claim 3 wherein the chlorine-oxygen mixture contains about 45% by volume of chlorine.

References Cited in the file of this patent

UNITED STATES PATENTS 3,011,865  Benedict et al. _____ Dec. 5, 1961